*Inventors*
Paul F. Hayner
Daniel Blitz
Kenneth E. Mayo
Edgar R. Bernier

Robert O. Richardson
*ATTORNEY*

Nov. 24, 1964 P. F. HAYNER ETAL 3,158,696

TAPE RECORDER

Filed Jan. 3, 1961 3 Sheets-Sheet 2

*Inventors*
Paul F. Hayner
Daniel Blitz
Kenneth E. Mayo
Edgar R. Bernier

Robert O. Richardson
*ATTORNEY*

*Inventors*
Paul F. Hayner
Daniel Blitz
Kenneth E. Mayo
Edgar R. Bernier
Robert O. Richardson
*ATTORNEY*

3,158,696
TAPE RECORDER

Paul F. Hayner, Nashua, N.H., Daniel Blitz, Boston, Mass., and Kenneth E. Mayo and Edgar R. Bernier, Nashua, N.H., assignors to Sanders Associates, Inc., Nashua, N.H., a corporation of Delaware Filed Jan. 3, 1961, Ser. No. 80,068
5 Claims. (Cl. 179—100.2)

This invention relates to tape recorders, and more particularly it relates to a miniature long life, low power, instant start tape recorder which records only pre-selected signals and which loses no portion of signal and still does not use tape when these signals are not present for recording.

It is desirable to have a recording device which will record random and intermittent signals over a long period of time without continuously using recording tape during those periods when no information is presented. To do this the recorder must receive the signal to be recorded and use this signal to initiate tape movement for recording. In doing this none of the initial signal must be lost but must be completely recorded. The ideal situation would be some sort of anticipation mechanism that would start the recorder just before the incoming signal was received. In addition to the foregoing criteria, size and environmental restrictions are critical, such that the recorder must also be a low power consumption device.

Therefore, an object of this invention is to provide for a tape recorder which will record only selected signals without wasting recording tape during periods of time when no information is presented.

Another object is the provision of a tape recorder wherein the incoming signal actuates the movement of the recording tape over the recording head.

Another object is the provision of a tape recorder wherein the tape speed is brought to full recording speed in time to receive the initial input signal to be recorded.

Another object is the provision of a parallel input signal path for a recorder wherein the incoming signal in one path actuates the tape movement mechanism, and wherein the incoming signal in the other line to the recording head is delayed until recording speed is achieved, such that the initial incoming signal is not lost in the actuation time delay of the recorder.

Another object is the provision of a tape recorder having incoming signal paths for signal actuation of the recording mechanism before the signal is received for recording.

Another object is the provision of a tape recording device wherein the incoming signal actuates the tape, yet there is no signal loss due to inherent delay in operation in the recording actuating mechanism.

Another object is the provision of a signal actuating tape recorder wherein the recording signal is delayed until the fast-start recording mechanism is brought up to recording speed before the recording signal reaches the recording head.

A further object is the provision of a tape recorder wherein the tape is not moving when the recorder is in standby or non-operating condition until an incoming signal causes the engagement of sufficient forward torque to move the tape.

Another object is the provision of a tape recorder wherein the tape moving mechanism is continuously in motion although disengaged from the tape and a continuous opposing torque is applied in both directions on the tape to hold it in standby non-moving condition.

Another object of the present invention is the provision of a compensating means for a torque differential when substantially equal torque is applied in both directions on a recording tape to thereby hold it motionless in standby non-operating condition.

A further object is the provision of a torque applied in opposite directions on the tape of a tape recorder in its standby condition wherein slight discrepancies for torque differential does not cause tape movement due to a spring friction pad urging the tape against the record and play back head.

A further object is the provision of a fast-start recording mechanism wherein a tape reservoir supplies tape to the recording head until the tape supply reel and tape takeup reel achieves proper rotation speed.

Another object is the provision of a fast-start recording mechanism for a tape recorder wherein the tape moving means and the tape reel actuating means constitutes a continuously revolving fly wheel which may be engaged therewith.

A further object is the provision of a long-life, low-power, small size, light-weight recording mechanism wherein a continuously revolving fly wheel may be engageable with the tape for movement thereby, and wherein the revolving fly wheel is energized by a point contact drive from an electrical motor to overcome friction.

Another object is the provision of a tape recorder wherein a low powered motor continuously drives a flywheel which in turn may be readily engaged with recording tape for passage by a recording mechanism.

Another object is the provision of a fast-start recording unit wherein substantially equal torque is applied in both directions on the recording tape continuously, and wherein the incoming signal actuates a solenoid assembly to urge the tape against a continuously moving capstan for tape movement.

A further object is the provision of a signal actuated driving means for driving the tape wherein the signal actuating means constitutes a fast-acting solenoid having an impulse actuated start coil which is then replaced during operation with a holding solenoid having a low power consumption holding coil to thereby save power with resulting size and weight.

Another object is the provision of a recording solenoid for actuating a tape movement on a tape recorder wherein the initial signal is passed through a heavy wire of few turns for quick response and thereafter signals are passed through a holding coil of smaller wire of more turns for less power consumption during the holding and recording period.

Another object is the provision of a long-life, low-power, small size, light-weight recording mechanism wherein there is no tape movement except when an input signal is received, at which time a low-power consumption holding coil causes engagement of the tape with a continuously moving fly wheel having a point contact drive with an electrical motor to overcome friction and to maintain operating speed.

Another object is the provision of a long-life, low-powered tape recorder such that the battery power supply has a weight of approximately 0.04 pound per hour of operation.

Another object is the provision of an expendable compact light weight battery operated tape recorder which may be used up to 50 hours' duration with accumulative recording time of approximately one hour.

Another object is the provision of a recorder which will start recording any selected input signal with a maximum signal loss of 350 microsecond duration after receipt of the recording command and through the use of a delay line whereby this time loss in input can then be reduced to zero or negative time.

Other objects of my invention will in part be obvious and will in part appear hereinafter.

The invention accordingly comprises the features of construction, combination of elements, and arrangement of parts which will be exemplified in the construction hereinafter set forth and a scope of the invention will be indicated in the claims.

The recorder comprising the present invention consists of a two-reel storage system with a high starting speed mechanism used in conjunction with a lumped parameter delay line to provide the necessary time delay and allow the recorder to come up to recording speed by the time the signal has arrived at the recording head. This delay line introduces no loss in signal nor increase in noise level because of the very small delay time required with the quick response of the tape actuating mechanism. (Longer delays would involve loss in signal, introduce noise and require use of amplifiers.) In effect the recorder is idling until receipt of an input signal at which time it will accelerate to recording speed in less time than it takes for the signal to go through the delay line, thus recording all of the desired signal. The motor that drives the tape is continuously operating under idle or standby condition, driving both the low-speed and high-speed capstans at governed speeds with inertial energy stored in the flywheel mounted on the low-speed capstan. The momentum of the flywheel is used to accelerate a small section of the tape looped around a low inertia spring balanced tape loop carriage. This is the only part of the tape required to move at the high acceleration necessary to obtain the required high speed of response recording action.

The signal actuated lever arm carrying the pinch rollers is required to move only through an angle of approximately one milliradian and the record solenoid and the solenoid circuitry are designed to provide extremely high speed of response of force on the pinch rollers upon the receipt of the input signal. These rollers press the tape against the already rotating capstan to move the tape. In this manner the recorder is able to come to efficient recording condition from the idling condition within an ample margin of safety to eliminate any loss of signal since the delay line is designed to delay the input signal to the recording head until such efficient recording speed has been reached.

During the idle condition the counter-rotating capstans exert slightly unbalanced forces on the tape so that slight movement or creeping results. The problem of these unequal forces on the tape is eliminated by pressing the tape against the recording head by means of a spring, causing a friction force. This pressure also provides a more positive contact with the recording head.

The electronic components are completely transistorized and allow the recorder to be packaged in small units of various dimensions for different applications. For example, the embodiment shown and described is 4½ inches in diameter by 3¾ inches in length. A wafer type recorder has been designed with dimensions 8 inches by 8 inches by 1 inch and still another is 6 inches by 4 inches by 2 inches. These units weigh about 2.5 pounds, including the lumped parameter delay line, and have a power consumption of 2 watts. Hum and noise are reduced by shielding the D.C. motor and introducing an RF filter. The recorders are provided with seals to make them completely dust and water proof. The upper shock limit is of the order of 200 *g*'s. These features of size and durability make it possible for the recorder to operate in environmental extremes prohibited of all other tape recorders. This tape recorder has the further advantage in that the delay line is a passive network and introduces no distortion, whereas quick start mechanisms heretofore used will record and erase continuously and re-record onto a storage drum all pertinent signals.

For a fuller understanding of the preferred embodiment of this invention, reference is now had to the drawings wherein.

Figure 1:
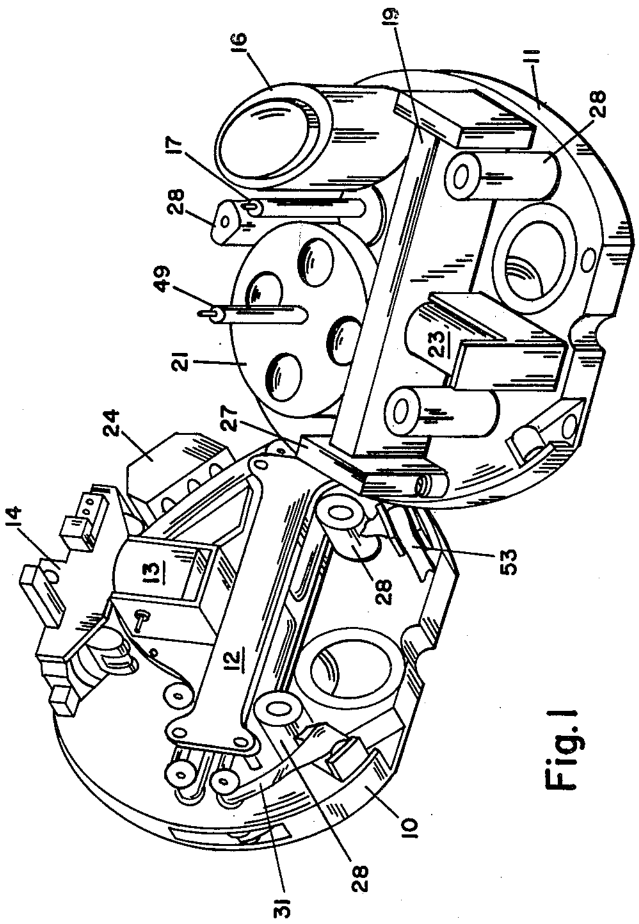
FIGURE 1 shows a prospective of the recorder opened up to better illustrate the inner working parts and their relationships.

Referring now to FIGURE 1, there is shown the recording device with spaced apart tape reel housings 10 and 11 with the driving and recording mechanism sandwiched in between. These components consist of a spring balanced tape loop carriage 12 for supplying tape until the tape takeup and supply reels reach proper recording speed, recording head 13, a solenoid actuated pinch roller mechanism 14 on the left hand portion and on the right hand portion there is shown a shielded D.C. motor 16 operating a driving gear 17 which continuously urges the rotation of tape reel in housing 10 through a pulley 18. Drive gear 17 also has a friction clutch which rotates flywheel 21 which in turn exerts a torque on tape in reel housing 11 through another pulley 22, not shown. Completing the assembly is shown circuit board components 23, potting assembly 24, playback amplifier and equalizer assembly 26 and relay 27. Spacers 28 maintain the two recorder sections in fixed spaced relationship in its completed assembly.

Figures 2, 3:
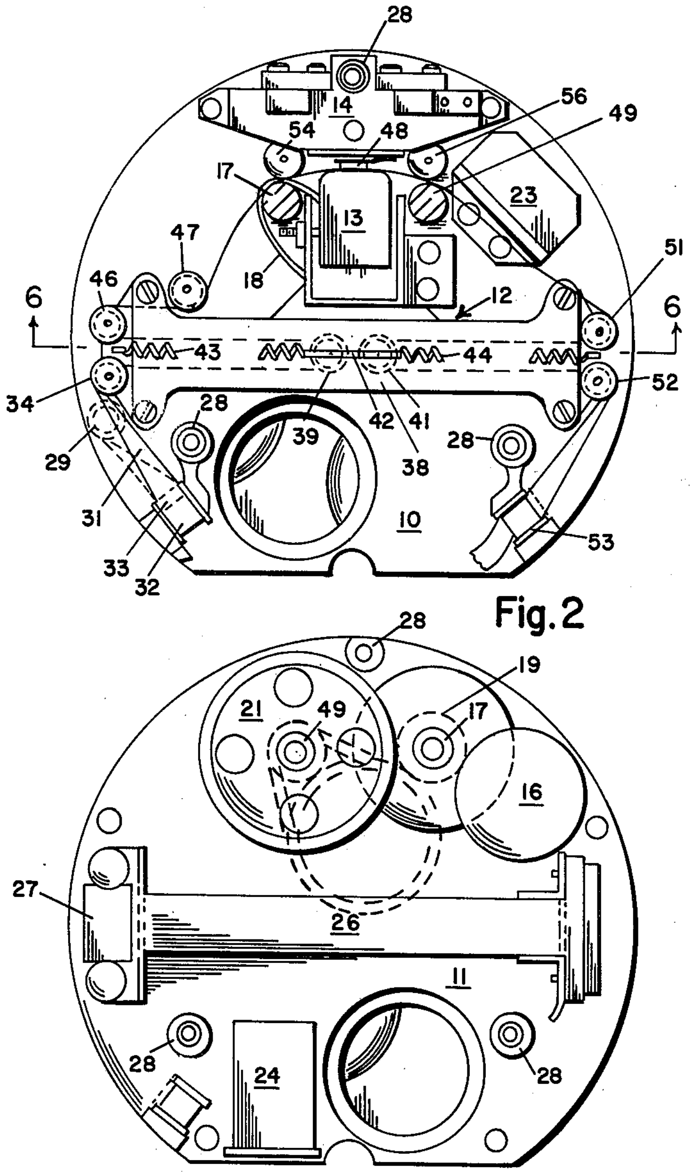
FIGURE 2 is a plan view of the right hand portion of FIGURE 1.
FIGURE 3 is a plan view of the left hand portion of FIGURE 1.

Referring now to FIGURE 2, upon actuation the tape from reel housing 10 passes over roller 29 whose axis is parallel with the axis of the tape reel. The tape 31 is given a half twist and passed over rollers 32 and 33 to move inwardly from the plane of housing 10. The tape is then given a half twist and passed over roller 34 to enter the tape loop carriage 12. The carriage has a face plate 36 spaced from the reel housing. Rollers 39 and 41 are connected together by a guide 42 which moves in grooves in the face plate 38 and the tape housing 10. Balanced springs 43 and 44 maintain the rollers and guide 42 in a central position although the springs are such that lateral movement is readily permissible. After the loop has passed over roller 39 the tape is then looped around rollers 46 and 47 and passed over gear drive shaft 17 which is continually rotating in a counter-clockwise direction. The tape then passes between recording head 13 and the spring pad 48 after which the tape is then passed over the axle 49 of flywheel 21, around roller 51, and back into the tape loop carriage 12. Here the tape passes over roller 41, back out the carriage over roller 52 and with a half loop it is passed over roller 53 where it is then passed to the other tape reel shown in FIGURE 3.

Mounted over the gear drive shaft 17 and the flywheel axle 49, which are rotating in opposite directions, are pinch rollers 54, 56 which are solenoid actuated to engage and urge the tapes against their respective drives in a manner more fully explained in connection with FIGURE 4.

After the tape leaves roller 53, it is passed over roller 54 in FIGURE 3 and onto tape reel housing 11. Shown in greater clarity in FIGURE 3 is the D.C. motor 16 which operates drive shaft 17 which has a friction clutch 19. This clutch has a curved edge which makes point contact with a truncated conical surface on flywheel 21 and thus avoids "tooth contact" flutter inherent in gear drives. This causes rotation of flywheel and flywheel axle 49 which in turn urges the tape in its forward direction. The playback amplifier and equalizer assembly 26 and the RF filter 24 are conveniently mounted.

Figure 4:
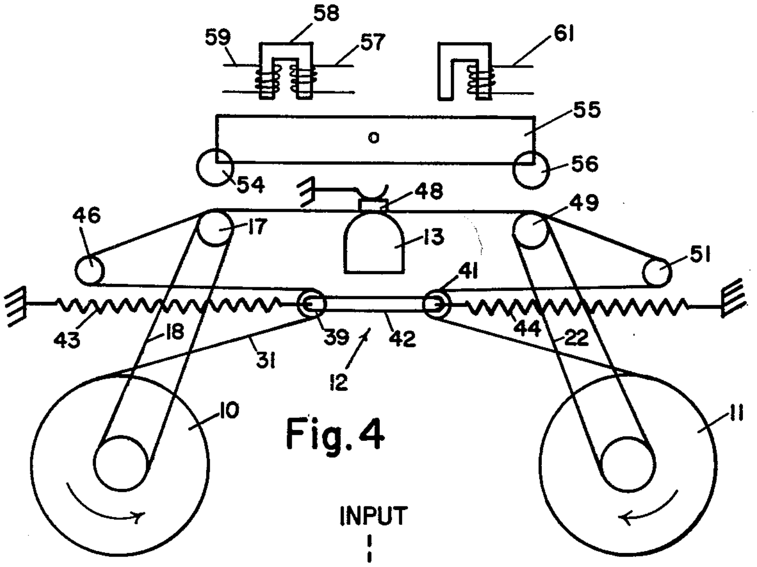
FIGURE 4 is a schematic illustrating the tape paths and drive mechanisms.

FIGURE 4 is a schematic illustration of the tape drive mechanism. In the standby condition the motor is constantly operating to drive two capstans (driving gear) 17 and capstan (flywheel axle) 49 in opposite directions, and the armature rocket arm 55 is in neutral position so that neither pinch rollers 54 or 56 are urged against the tape. As shown, the tape will pass from the feed or supply tape reel housing 10, around roller 39 in the tape loop carriage 12, around roller 46, over the capstan 17, between the spring pad 48 and recording head 13, over capstan 49, around roller 51, over roller 41 of the tape loop carriage and onto the takeup tape reel 11. The rotation of capstan 17 urges roller 10 to rotate in a counterclockwise direction as shown by the arrow and capstan 49 causes takeup tape reel 11 to rotate in a clockwise direction as shown by the arrow, although such rotation is not actually accomplished in the standby condition because of slippage of the belts 18 and 22 around their respective capstans. Ideally, the torque is equal in an opposite direction so that the tape does not move in standby condition. However, because of the varying amounts of tape on the reels and because the capstans rotate at different speeds, the forces on the tape are not equal and opposite. To overcome this difference of force which generally exists, a friction force is supplied by the spring pad 48 which presses the tape against recording head 13. The tension in the spring is adjusted so that the friction force is large enough to overcome any difference in force that might exist. Thus, in standby condition, the capstans turn, causing the belts to attempt to turn the reels in opposite directions and since the forces are unequal, the differential force which otherwise would cause tape movement is overcome by the friction force on the hold spring.

The belts thus slip and the machine operates in an idle condition.

In recording operation, the signal is first fed to a start coil 57 on the record armature 58. Current build-up is extremely rapid in the start coil solenoid since it has a low time constant because of the small number of turns and the heavy wire. Since it takes less force to hold the armature than to trigger it, hold coil 59 is used. The current in the hold coil 59 may be made to build up slowly to a small value by using a coil of fine wire with many turns. Power is thus conserved after the initial pull to trigger the armature. The armature 55 by the action of the start and hold coils 57 and 59 is pulled and held in a clockwise direction, forcing roller 56 on the end of the armature to pinch the tape 31 against the rotating capstan 49. This large additional force supplied to the tape by the rotating capstan 49 moves the tape to the right.

This movement of the tape is provided for before sufficient rotation of the tape reels by the contraction of the spring 43 and the expansion of spring 44 as the guide 42 moves to the left. This small reservoir allows for the movement of tape past the recording head even before the takeup reel and the supply reel have come up to recording speed. As the reels reach recording speed, the guide 42 gradually returns to its normal central position.

Figure 5:
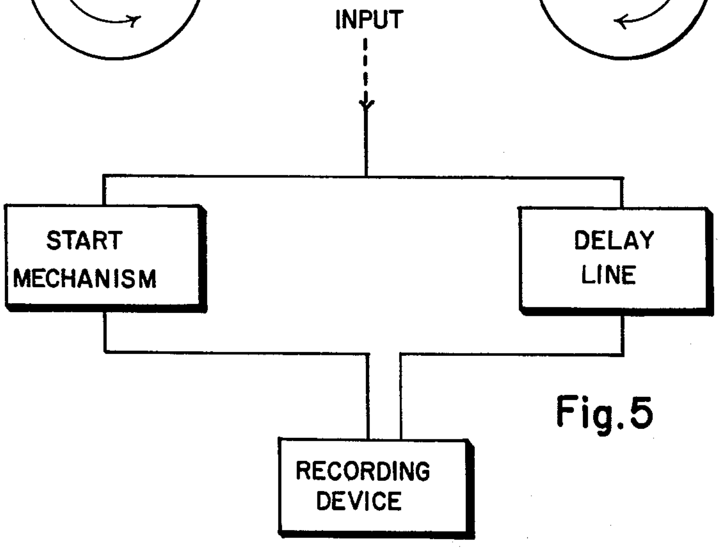
FIGURE 5 shows in block diagram the parallel paths of the input signal to the recording device.

While the quick start process just described is commencing, the incoming signal meanwhile has been delayed by a delay line as shown in FIGURE 5. Here, shown in block diagram form, are parallel lines through which the signal input passes. One parallel path is the starting mechanism wherein the recording armature is actuated to start the tape movement, and the other path is a delay line wherein the incoming signal is delayed for a sufficient time so that it is not lost while the tape is approaching recording speed as it passes under the recording head. When the incoming signal ceases, the end part of the signal is reached first by the operating mechanism before it reaches the recording head for recording. However, inertia carries the tape forward until the last of the signal is recorded.

Referring back to FIGURE 4, the recorder may be run in the reverse direction by actuating the playback coil 61 which causes the armature 55 to rotate in a counterclockwise direction and pinching the tape against capstan 17 through roller 54 on the armature. For some applications this rapid reverse playback is desirable since a second recording may be made and a second backwards playback will allow rapid examination of the information recorded. When this is not desirable, the rapid backward playback may be used as a rapid rewind, and the playback may proceed in the forward direction. For this reason the running capstan 17 is geared to operate at a greater speed than the capstan 49.

Figure 6:
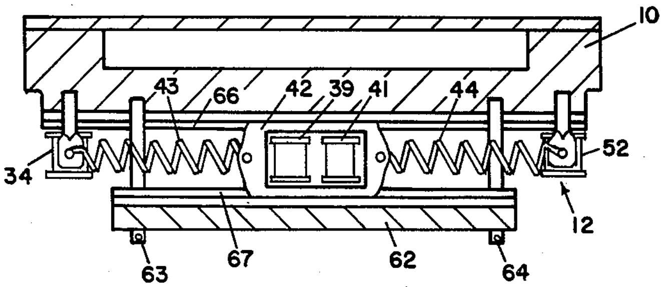
FIGURE 6 is a cross sectional view of the spring balanced tape loop carriage taken along the line 6—6 of FIGURE 2.

The spring balanced tape loop carriage 12 is shown in plan view in FIGURE 6. A guide plate 62 is attached through screws 63, 64 to the tape reel housing 10. Groove guides 66 and 67 contain the guide 42 and permits it to move therealong. Springs 43 and 44 are suitably attached at one end to the reel housing 10 and at the other end to the guide 42 to normally position it in the center, as shown, yet to permit lateral movement when external forces are applied. As more clearly shown in FIGURE 2, the rotation of the flywheel axle or capstan 49 exerts a pull on the tape 31 to the right, causing spring 43 to contract and permitting spring 44 to elongate, thus moving the carriage to the left. The length of tape between rollers 34 and 39 and back to roller 46 constitutes the tape reservoir which permits passage of the tape under the recording head before the supply reel in housing 10 is up to operating speed. Similarly, the expansion of spring 44 makes the loop of tape between rollers 41 and 52 longer to take up the extra tape that has passed through the recording head before the takeup reel in housing 11 has come up to operating speed.

Having thus described the preferred embodiment, it is obvious that many modifications will become apparent to those skilled in the art, and it is intended that these modifications be considered as part of the invention as defined in the following claims.

What is claimed is:

1. A signal actuated tape recording mechanism wherein the recording tape is not moved past the recording head except in the presence of a signal to be recorded, said mechanism including a signal input to parallel electrical paths, one of said electrical paths being connected to actuate the recording mechanism and the other of said parallel paths being connected to the recording head to transmit the incoming signal thereto for recording on tape passing thereby, said other path having a delay line therein to slow the transmission of said signal to said recording head until after said recording mechanism has been actuated and tape is moving past said recording head at proper recording speed, said mechanism including a continuously rotating capstan connected to a continuously rotating flywheel, said flywheel being motor driven through a point drive contact at sufficient power to overcome friction, said rotating capstan being connected to a takeup tape reel through a slip drive mechanism whereby in the absence of further friction, tape would be wound on the reel, a counter-rotating capstan, said counter-rotating capstan having a slip friction drive to the tape supply reel to exert a substantially equal and opposite torque on the tape whereby said tape does not move under the influence of said rotating capstan, a spring urged pad for urging said tape against said recording head to thereby compensate for any difference in torque to said tape by said capstans, a signal responsive pinch roller mechanism for exerting additional forward torque to said tape to cause movement thereof, said pinch roller mechanism consisting of an armature with rollers on both ends, each positioned to engage the tape, and to be urged against said capstans, said armature being first energized by a fast acting solenoid consisting of an impulse actuated start coil and thereafter by a low-power consumption hold coil, said armature being actionable in the reverse direction by a reverse coil which urges the other of said rollers against said counter-rotating capstan for rapid reverse winding of the tape, and a tape reservoir for supplying tape for transmission past the recording head before the takeup and supply reels have reached operating speed, said tape reservoir comprising a tape loop carriage having a spring balanced roller guide positioned centrally thereon and adapted for transverse movement, a plate on one side of said carriage and the tape supply reel housing on the other side of said carriage, grooves in said plate and said supply reel housing adapted to receive said roller guide and permit translational movement thereby, tape from said supply reel passing over one of the rollers on said roller guide, thence past the recording head and over the other of said roller guide rollers before being wound on the takeup reel, whereby torque on said tape in one direction will move the tape loop carriage in the other direction to thereby provide an amount of tape for movement past the recording head before the takeup and supply reels have reached operating rotational speed.

2. A signal actuated tape recording mechanism wherein the recording tape is not moved past the recording head except in the presence of a signal to be recorded, said mechanism including a continuously rotating capstan connected to a continuously rotating flywheel, said flywheel being motor driven through a point drive contact at sufficient power to overcome friction, said rotating capstan being connected to a takeup tape reel through a slip drive mechanism whereby in the absence of further friction, tape would be wound on the reel.

a spring urged pad for urging said tape against said recording head to thereby retain said tape without movement in standby condition, a signal responsive pinch roller mechanism for exerting additional forward torque to said tape to cause movement thereof, and a tape reservoir for supplying tape for transmission past the recording head before the takeup and supply reels have reached operating speed, said tape reservoir comprising a tape loop carriage having a spring balanced roller guide positioned centrally thereon and adapted for transverse movement, a pair of rollers on said guide, tape from said supply reel passing over one of the rollers on said roller guide, thence past the recording head and over the other of said roller guide rollers before being wound on the takeup reel, whereby torque on said tape in one direction will move the tape loop carriage to thereby provide an amount of tape for movement past the recording head before the takeup and supply reels have reached operating rotational speed.

3. A signal actuated tape recording mechanism wherein the recording tape is not moved past the recording head except in the presence of a signal to be recorded, said mechanism including a signal input to parallel electrical paths, one of said electrical paths being connected to actuate the recording mechanism and the other of said parallel paths being connected to the recording head to transmit the incoming signal thereto for recording on tape passing thereby, said other path having a delay line therein to slow the transmission of said signal to said recording head until after said recording mechanism has been actuated and tape is moving past said recording head at proper recording speed, said mechanism including a continuously rotating capstan connected to a continuously rotating flywheel, said flywheel being motor driven through a point drive contact at sufficient power to overcome friction, said rotating capstan being connected to a takeup tape reel through a slip drive mechanism whereby in the absence of further friction, tape would be wound on the reel, a counter-rotating capstan, said counter-rotating capstan having a slip friction drive to the tape supply reel to exert a substantially equal and opposite torque on the tape whereby said tape does not move under the influence of said rotating capstan, and a tape reservoir for supplying tape for transmission past the recording head before the takeup and supply reels have reached operating speed, said tape reservoir comprising a tape loop carriage having a spring balanced roller guide positioned centrally thereon and adapted for transverse movement, a pair of rollers on said guide, tape from said supply reel passing over one of the rollers on said roller guide, thence past the recording head and over the other of said roller guide rollers before being wound on the takeup reel, whereby torque on said tape in one direction will move the tape loop carriage to thereby provide an amount of tape for movement past the recording head before the takeup and supply reels have reached operating rotational speed.

4. A signal actuated tape recording mechanism wherein the recording tape is not moved past the recording head except in the presence of a signal to be recorded, said mechanism including a spring urged pad for urging said tape against said recording head to thereby retain said tape in nonmoving condition until further torque is applied, a signal responsive pinch roller mechanism for exerting additional forward torque to said tape to cause movement thereof, said pinch roller mechanism consisting of an armature with rollers on both ends, each positioned to engage the tape and to be urged against said capstans, said armature being first energized by a fast acting solenoid consisting of an impulse actuated start coil and thereafter by a low-power consumption hold coil, said armature being actionable in the reverse direction by a reverse coil which urges the other of said rollers against said counter-rotating capstan for rapid reverse winding of the tape.

and a tape reservoir for supplying tape for transmission past the recording head before the takeup and supply reels have reached operating speed, said tape reservoir comprising a tape loop carriage having a spring balanced roller guide positioned centrally thereon and adapted for transverse movement, a pair of rollers on said guide, tape from said supply reel passing over one of the rollers on said roller guide, thence past the recording head and over the other of said roller guide rollers before being wound on the takeup reel, whereby torque on said tape in one direction will move the tape loop carriage to thereby provide an amount of tape for movement past the recording head before the takeup and supply reels have reached operating rotational speed.

5. A signal actuated tape recording mechanism wherein the recording tape is not moved past the recording head except in the presence of a signal to be recorded, said mechanism including a signal input to parallel electrical paths, one of said electrical paths being connected to actuate the recording mechanism and the other of said parallel paths being connected to the recording head to transmit the incoming signal thereto for recording on tape passing thereby, said other path having a delay line therein to slow the transmission of said signal to said recording head until after said recording mechanism has been actuated and tape is moving past said recording head at proper recording speed, said mechanism including a continuously rotating capstan connected to a continuously rotating flywheel, said flywheel being motor driven through a point drive contact at sufficient power to overcome friction, said rotating capstan being connected to a takeup tape reel through a slip drive mechanism whereby in the absence of further friction, tape would be wound on the reel, a counter-rotating capstan, said counter-rotating capstan having a slip-friction drive to the tape supply, reel to exert a substantially equal and opposite torque on the tape whereby said tape does not move under the influence of said rotating capstan.

References Cited in the file of this patent

UNITED STATES PATENTS

| | | |
|---|---|---|
| 2,004,893 | Hall | June 11, 1935 |
| 2,542,192 | Handschin | Feb. 20, 1951 |
| 2,814,676 | House | Nov. 26, 1957 |
| 2,833,860 | Roberts | May 6, 1958 |
| 2,864,621 | Stavrakis | Dec. 16, 1958 |
| 2,904,275 | Selsted | Sept. 15, 1959 |
| 2,919,076 | Buslik | Dec. 29, 1959 |